United States Patent
Lukach, Jr.

(10) Patent No.: US 6,976,712 B2
(45) Date of Patent: Dec. 20, 2005

(54) CORROSION-RESISTANT COUPLING MEANS AND METHODS FOR USING SAME

(75) Inventor: Arthur S. Lukach, Jr., Yonkers, NY (US)

(73) Assignee: Micromold Products Inc., Yonkers, NY (US)

(*) Notice: Subject to any disclaimer, the term of this patent is extended or adjusted under 35 U.S.C. 154(b) by 0 days.

(21) Appl. No.: 10/417,930

(22) Filed: Apr. 17, 2003

(65) Prior Publication Data

US 2004/0017082 A1 Jan. 29, 2004

Related U.S. Application Data

(60) Provisional application No. 60/373,692, filed on Apr. 17, 2002.

(51) Int. Cl.[7] ............................................. F16L 55/00
(52) U.S. Cl. ...................................... 285/351; 285/369
(58) Field of Search ................................ 285/351, 369, 285/382.2, 326

(56) References Cited

U.S. PATENT DOCUMENTS

| | | | | |
|---|---|---|---|---|
| 2,829,909 A | * | 4/1958 | Magnani | 285/345 |
| 2,914,347 A | * | 11/1959 | Magnani | 285/349 |
| 3,149,861 A | * | 9/1964 | Gunnar | 285/349 |
| 3,210,102 A | * | 10/1965 | Earl | 285/374 |
| 3,343,252 A | * | 9/1967 | Reesor | 29/458 |
| 3,378,282 A | * | 4/1968 | Demler | 285/148.13 |
| 3,425,452 A | * | 2/1969 | Shaw | 138/89 |
| 3,501,178 A | * | 3/1970 | Watts | 285/369 |
| 3,563,574 A | * | 2/1971 | Jackson et al. | 285/187 |
| 3,565,468 A | * | 2/1971 | Garrett | 285/373 |
| 3,596,939 A | * | 8/1971 | Gibson | 285/382.2 |
| 3,632,141 A | * | 1/1972 | Larsson | 285/24 |
| 3,915,480 A | * | 10/1975 | Kish et al. | 285/148.13 |
| 3,977,708 A | * | 8/1976 | Jopp | 285/342 |
| 4,018,462 A | * | 4/1977 | Saka | 285/111 |
| 4,221,407 A | * | 9/1980 | Steimle | 285/236 |
| 4,274,662 A | * | 6/1981 | de Groot et al. | 285/21.1 |
| 4,328,982 A | * | 5/1982 | Christianson | 285/351 |
| 4,371,199 A | * | 2/1983 | Kushner et al. | 285/382.2 |
| 5,039,137 A | * | 8/1991 | Cankovic et al. | 285/236 |
| 5,099,825 A | * | 3/1992 | Massey et al. | 122/13.01 |
| 5,480,196 A | * | 1/1996 | Adams, Jr. | 285/369 |
| 5,566,984 A | * | 10/1996 | Abbema et al. | 285/22 |
| 5,681,062 A | * | 10/1997 | Fukao et al. | 285/340 |
| 5,749,138 A | * | 5/1998 | Usui et al. | 29/516 |
| 5,918,914 A | * | 7/1999 | Morris | 285/351 |
| 6,049,962 A | * | 4/2000 | Pfeiffer | 29/515 |
| 6,059,338 A | * | 5/2000 | Diederichs | 285/55 |
| 6,481,764 B1 | * | 11/2002 | Kwok | 285/382 |

* cited by examiner

*Primary Examiner*—Eric K. Nicholson
(74) *Attorney, Agent, or Firm*—Fulbright & Jaworski LLP (57) ABSTRACT

A coupling couples pipes of pipe fixes, especially polytetrafluoroethylene pipes. Methods for using the coupling are also provided.

11 Claims, 7 Drawing Sheets

CORROSION-RESISTANT COUPLING MEANS AND METHODS FOR USING SAME

RELATED APPLICATION

This application is a continuation-in-part of pending U.S. provisional patent application Ser. No. 60/373,692 filed on Apr. 17, 2002, which is incorporated by reference in its entirety herein.

APPENDIX

Attached hereto is an Appendix including various documents that describe the present invention in detail (pages A-1 to A-39). This Appendix is incorporated therein by reference in its entirety.

FIELD OF THE INVENTION

This invention relates to a new device and method for the leak-proof coupling of corrosion-resistant plastic tubing and piping materials, either to other such materials, or to rigid tubing and piping materials such as metals, ceramics and glasses.

BACKGROUND OF THE INVENTION

There exists a need in a vast number of industrial applications to connect or otherwise couple tubing, piping and fixtures, in such a way that leaks are prevented. While leak prevention is always desirable, it is an absolute necessity in applications where dangerous substances, e.g., caustic agents, explosive agents, flammable agents, toxic and/or biological agents, are being handled due to personal health and safety concerns, process efficiency concerns, and to prevent damage to property adjacent to potential leaks.

In many industrial applications, for instance in pharmaceutical and chemical research facilities, chemical and pharmaceutical processing plants, semiconductor manufacturing facilities and other similar facilities, corrosive materials are necessarily and routinely handled and disposed of. Corrosive materials present special handling and disposal problems in that traditional piping systems, which include steel, iron, copper and various plastic pipes, connectors and fixtures, are incapable of handling many corrosives due to the chemical reactivity or solubility of these materials. Corrosive materials, including strong acids, strong bases, and strong solvents would, sooner or later, "eat through" or otherwise destroy these materials, resulting in their failure.

In industry, the problem of corrosive materials is often dealt with by employing glass or ceramic (hereafter "glass") pipes and tubes (hereafter "pipes"). Such materials have the advantage of not being reactive towards most chemical agents, with the additional advantage of being resistant to temperature extremes. Thus, many industrial applications in which corrosive agents are handled today employ, at least in part, glass piping.

Despite its advantages, glass piping also has certain critical disadvantages. Most notably, glass piping is extremely brittle. Glass piping is also very inflexible. Stress applied to glass tubing during the course of installation (due to dropping, overtightening of coupling devices, deflections from "straight" connections between glass components and other stresses occasioned by both proper and improper installations) or in the course of use, often leads to cracks, fractures and breaks. Such breaks are often difficult to repair due to the rigidity and fragility of glass pipe sections adjoining the broken section. These disadvantages make the installation, maintenance and use of glass piping systems difficult and expensive. These disadvantages also lead to environmental and workplace hazards which are considered undesirable by regulatory agencies such as the EPA and OSHA.

Piping systems comprising non-glass, non-reactive materials such as PTFE (polytetrafluoroethylene, often referred to—along with FEP and PFA—by DuPont's trade name Teflon®) have been proven to be an effective substitute for glass piping. Like glass piping, Teflon piping (typically, but not necessarily made from extruded or compression molded PTFE) is non-reactive with almost all chemical agents. Unlike glass piping, however, Teflon piping is not brittle and is not inflexible.

However, certain Teflon piping systems currently used in industry also have certain disadvantages for large system applications. In some Teflon piping systems, pipes are connected via threading. In practice, such Teflon piping is supplied in long unthreaded sections which are then cut to the needs of a particular application. After being cut, the installer must impart threading onto the pipe. Threading on the pipe sections is accomplished "in the field", i.e., by the installation contractor, and not by the pipe or fixture manufacturer. Such field threading is technically difficult and is often performed improperly, leading either to wasted pipe (if the improper threading is detected) or worse, less than adequate sealing between sections (if the improper threading is not detected). The threaded joints can also be difficult to join properly with their potential for cross-threading, or over or under tightening.

Threaded Teflon piping sections are also difficult to replace or repair because threaded pipes are not easily disassembled. In any sequential series of connected threaded pipes, removing a "middle" pipe section could require sequentially disassembling all or most pipe sections from one end of the series. This is because pipe sections cannot individually be unthreaded (unscrewed) from neighboring sections without necessitating disassembly of other sections "down the line" and/or "up the line". This problem, while always troublesome due to cost and time expenditures, is particularly vexing in long piping systems having many sequential joints.

Further, threaded Teflon pipes of a given inner diameter must be made with relatively thick sidewalls to accommodate the threading process, which necessarily removes sidewall material. The result is that thicker, heavier and thus more expensive piping must be employed. Put another way, thinner, less expensive piping may often be adequate but for the need for excess thickness at the ends of the tubings to accommodate a threaded connection.

Other forms of Teflon tubing systems joined by other methods are also available such as: small diameter systems joined by flare- or compression fittings, butt welded tubing systems, or tubing systems with sanitary end connections. These systems are generally not found not suitable for the applications in which threaded systems, have historically been used because they are often too small, and/or require complex and difficult to use field welding equipment, and/or are much more expensive, and/or are very thin-walled, allowing too much permeation, and/or are not sufficiently rigid to permit installation of systems that employ gravity draining.

In addition to straight section piping, almost all laboratory chemical disposal systems employ a plumbing fixture known as a trap, e.g., P-traps (the "P" deriving from the shape of the fixture). The P-trap is typically attached at its vertical end to the drain outlet of a sink, and at its horizontal end to a plumbing system. Even where the P-trap of the piping system is Teflon, the sink is often glass, or other rigid material.

There is often difficulty connecting the Teflon piping or a P-trap to a glass sink. In connecting Teflon piping or a P-trap to a glass sink, known coupling devices comprising Teflon, such as the Schott Process Systems, Inc.'s No. 6611 B/P Drainline Coupling, have been used, in which a glass-to-Teflon and Teflon-to-Teflon primary seals are formed, but in which there is no Teflon secondary seal. The coupler is held in place on the glass and on the Teflon pipe via friction resulting from rubber ribbing, grooves or other rubber portion in effect forming secondary rubber seals. The resulting seal, being rubber, is not impervious to corrosive agents which, when in contact with rubber, cause it to eventually corrode. Moreover, excess tightening of a coupling device to ensure the primary seal holds is of very little value, since the brittleness of the glass limits the possible degree of tightening. Often a faulty glass-to-Teflon seal is masked by the rubber secondary seal. After installation, the rubber seal becomes corrupted and fails. Thus, there is no glass-to-Teflon coupling device in which effective primary and secondary seals are capable of being formed.

Moreover, the P-trap is typically formed with beading at either end. Although beading geometry helps in forming a primary seal between the walls of the coupling device, it also significantly hinders the formation of a secondary seal. The larger diameter of the bead makes the presence of additional ribs "behind" where the bead is to be inserted difficult (since the bead must be forced past any such ribs to be seated within the coupler).

Finally, it is the nature of Teflon, and thus Teflon piping, to deform elastically and plastically. Plastic deformation or "creep" may cause difficulties in coupling Teflon pipes both to glass and to other Teflon piping. Tightening a coupling device often works well initially but requires retightening to account for creep caused by the original tightening. Creep lessens and ceases to be a practical problem after initial plastic deformation has taken place. In glass-to-Teflon connections the problem noted above with respect to an inability to overtighten due to glass brittleness is exacerbated by plastic deformation.

OBJECTS OF THE INVENTION

In view of the above-described shortcomings in the art of connecting Teflon piping, it is an object of the present invention to provide a coupling device for plastic piping such as Teflon piping which permits the formation of primary and secondary Teflon seals joining Teflon piping and also joining other types of piping or fixtures.

It is another objective of the present invention to create a device for coupling components for handling corrosive, toxic or otherwise dangerous chemical agents in which contact between corrosives and reactive piping materials are avoided.

It is a further object of the present invention to provide a system for connecting Teflon piping in which the replacement or servicing of piping or other components is permitted which limits the need to disassemble or to otherwise handle neighboring piping components.

The present invention also has as its objective a connecting device for effectively connecting glass or other rigid piping components with Teflon piping components.

Finally, it is an object of the present invention to provide an improved P-trap which comprises beaded ends but which permits, with greater ease, the formation of a secondary seal in addition to the seal formed by the beading.

SUMMARY OF THE INVENTION

In accordance with an embodiment of the present invention, a coupling device is provided in which an end of a piping section is firmly seated against a retaining wall. Non-reactive members within the side walls of the coupling device are tightened around the piping end to form primary and secondary seals.

In accordance with another embodiment of the present invention, the side walls of the coupling device as aforesaid are asymmetrically tightened around said pipe end so as to create a shallow groove in the pipe which, due to plastic deformation, secures the pipe end to the coupling device more closely as a result of the mechanical interaction between the shallow groove and the tightened portion of the coupling device.

In accordance with a further embodiment, the present invention provides a device and a method for securing beaded ends of piping and plastic fixtures such that primary and secondary seals are formed with minimal force and maximum sealing efficiency. This is a accomplished by positioning an O-ring (or similar member) of the beaded end adjacent or in close proximity to the bead. The bead is then seated in a coupling device against a retaining wall forming a first seal. The side walls of the coupling device are tightened and come in contact with the bead and O-ring to form primary and secondary seals, respectively. The O-ring's presence on the piping, rather than in the coupling device hindering the sealing of the piping, minimizes sealing failures.

In accordance with yet another embodiment, the present invention includes a novel beaded-end P-trap configuration which works in conjunction with a novel coupling device capable of being secured to the beaded end of the P-trap and the non-beaded ("plain") end of a glass fixture.

In still another embodiment, the side walls of the coupling device are approximately in the form of a bellows whose inner tips form one or more seals with the pipe. The bellows are pressed into place by a series of o-rings that are clamped as described herein.

While in the illustrated embodiments features of the invention have been put forward, it is to be understood that the invention is not limited to the precise form illustrated, and the changes may be made thereto without departing from the spirit or substance of the invention.

DESCRIPTION OF THE PREFERRED EMBODIMENT

Figure 1:
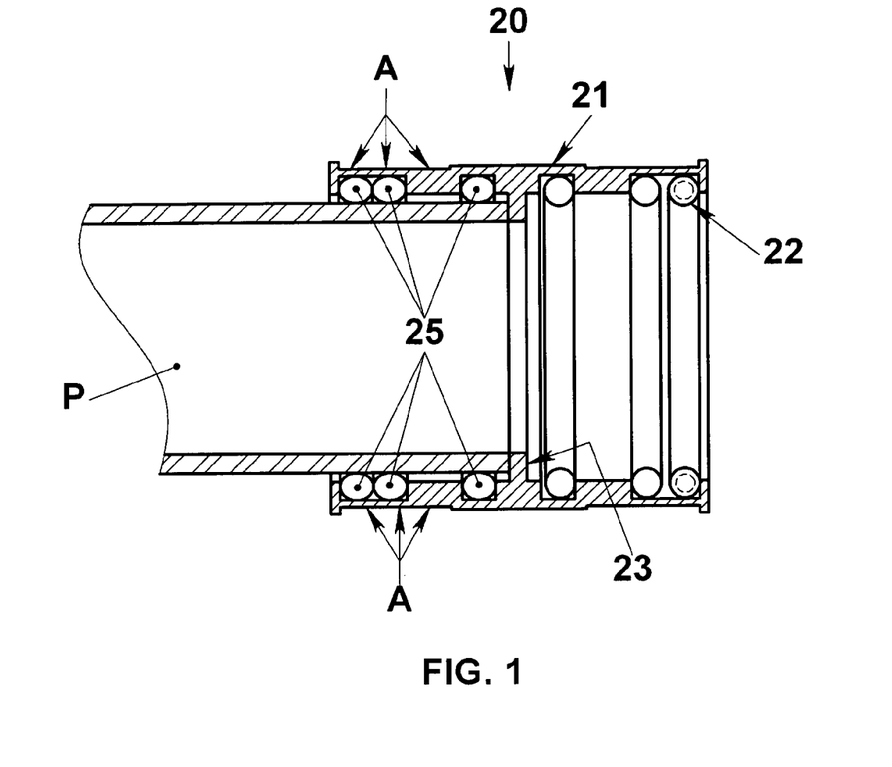
FIG. 1 shows the pipe-to-pipe coupling device of the invention in a side, cross-sectional view.

Referring to the drawings in detail, FIG. 1 shows the invention's coupling device 20 for coupling sections of piping. Side walls 21 and retaining stops 23 of the device comprise Teflon or similar flexible, non-reactive material. Piping ("P") is inserted into either end of the device. (Here, insertion into one end is shown for simplicity of illustration.) The end of the pipe is seated firmly and snugly against the retaining stop 23 and, when held in this snug position (described subsequently), forms a smooth inner bore for ease of drainage and cleanout.

The sides of the pipe end are in firm and snug contact with a series of O-rings 22 which form primary and secondary seals when pressure is applied as described herein. In the embodiment shown in FIG. 1, the pipe end contacts three O-rings (per side of the device), one near the center of the device, and one more remote from the center. Of course other configurations are contemplated, including but not limited to one remote ring and two more central rings. The rings are encapsulated with Teflon in one embodiment (depicted as dashed lines in one ring in FIG. 1). In other embodiments the O-rings are made of a single non-reactive substance such as Kalrez®, or are integrated into the side walls 21, or are external to the side walls as in the bellows design described above.

Figure 2:
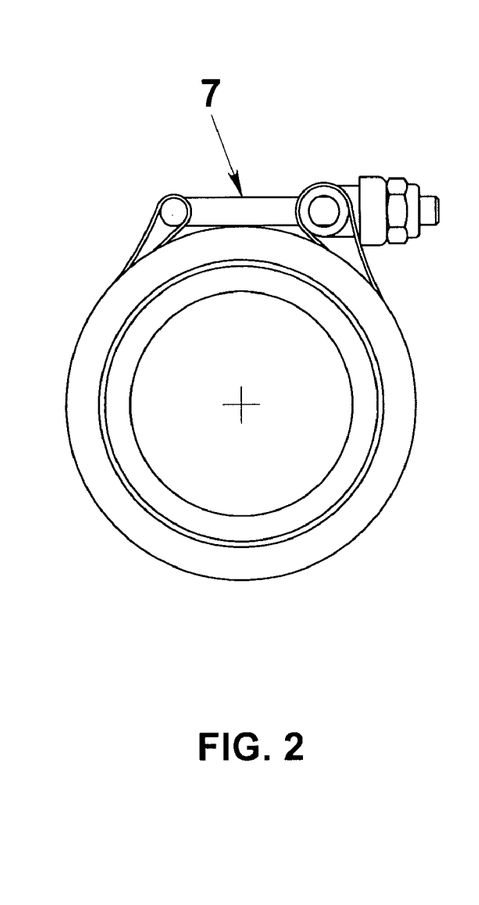
FIG. 2 shows a clamp used in connection with the invention.

A clamp is employed to apply pressure over a substantial length of the outer side wall around the circumference of the coupling device, depicted as A in FIG. 1. FIG. 1 shows only two dimensions, but in practice, the clamp, such as the clamp 7 shown in FIG. 2, applies pressure in 360° (or approximately 360°) around the coupling device. This pressure forces the side walls 21 and the O-rings 22 into close and tighter contact with the pipe, and creates primary and secondary seals 25.

Figure 5:
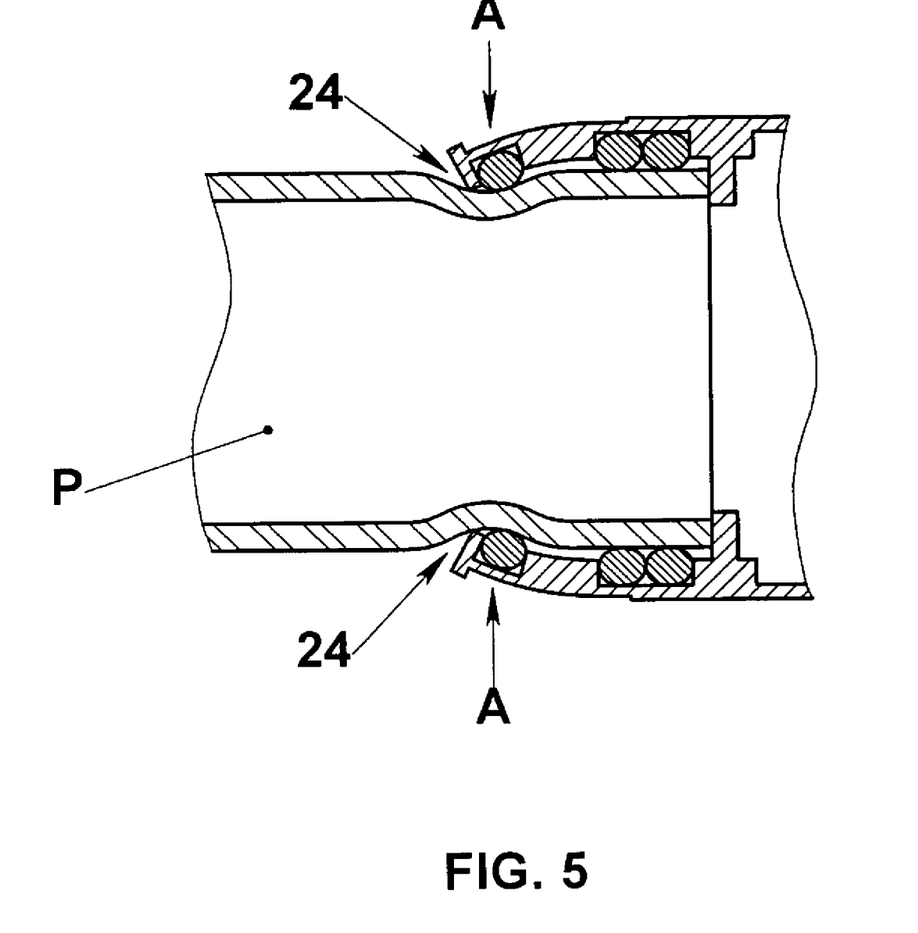
FIG. 5 shows a cross-sectional view of the pipe-to-pipe coupling device of the invention being a symmetrically tightened.

In certain embodiments, the clamps can be used such that pressure is applied to the coupling device asymmetrically near the end of the device and away from its center, as shown in FIG. 5. When this is done, the focused pressure A is of sufficient strength that the piping itself is plastically deformed, creating a groove 24. Groove 24 then acts to mechanically prevent the pipe from disengaging with the coupling device.

Figure 6:
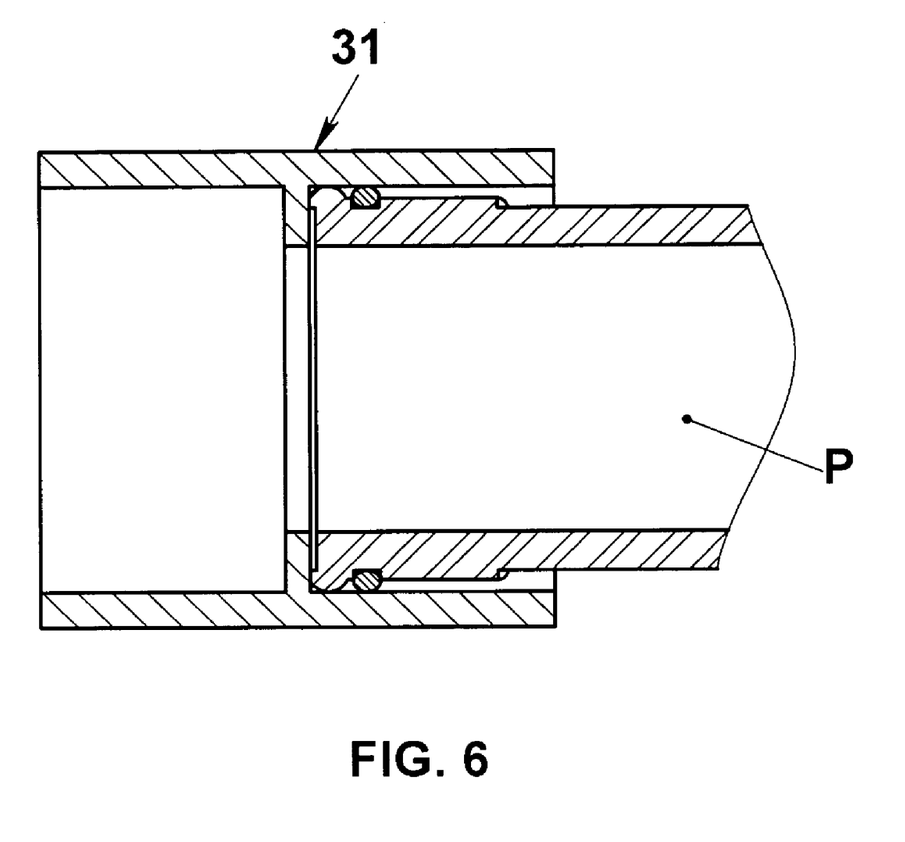
FIG. 6 schematically shows a cross-sectional view of the beaded pipe coupling device of the invention.
Figure 7:
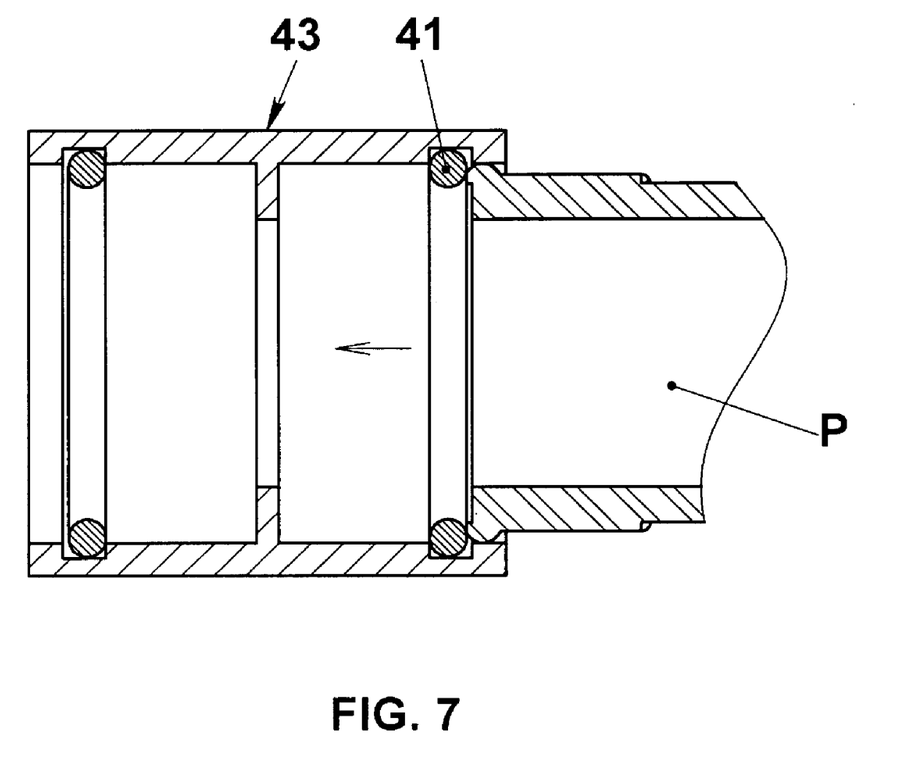
FIG. 7 schematically shows a cross-sectional view of a possible beaded and coupling device on which the sealing member is seated within the inner walls of the device, rather than on the beaded pipe.

FIG. 6 depicts a coupling device which employs the principals described above with reference to FIG. 1 (primary and secondary seals) in the context of beaded end pipe, such as on the ends of a P-trap. It is known that beaded ends allow for greater axial type loads by virtue of their unique geometry. A potential problem exists, illustrated in FIG. 7, where a secondary seal is desired. In FIG. 7, a Teflon encapsulated O-ring 41 embedded in a coupling device side wall 43 blocks insertion of the beaded pipe "P" and thus prevents the bead from seating against the retaining wall and forming a primary seal. While the use of "brute force" to cause the bead to clear the O-ring of FIG. 7 is possible, this could damage the pipe and/or the couplers. It is a much more elegant and ingenious solution to include the O-ring the beaded pipe. Upon seating the beaded pipe, as shown in FIG. 6, pressure is applied to the side wall 31 to form the secondary seal on the O-ring.

Figure 3:
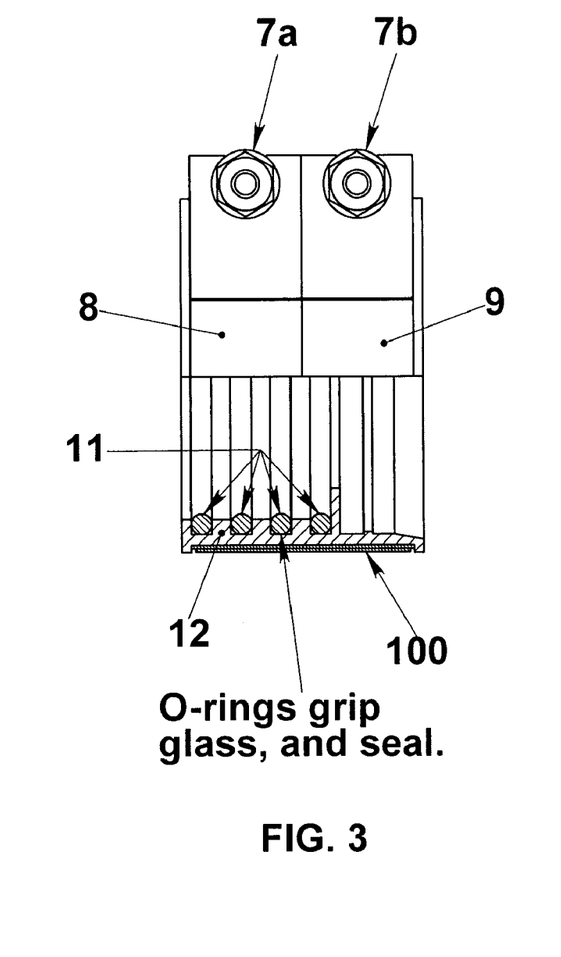
FIG. 3 shows the pipe-to-pipe coupling device of the invention in a partial cutaway side cross-sectional view.

FIG. 3 shows a coupling device employing the principles just described for securing a beaded pipe on one end and capable of securing a plain end, such as the plain end of a glass sink on the other. The right side 9 of FIG. 3 shows a beaded end coupler. The left side 8 of FIG. 3 shows a series of Teflon-encapsulated O-rings 11 seated in the side wall 12. Multiple rings are desirable to better grip the flat and inflexible glass end, and also to form primary and secondary seals.

Stainless steel strap 100 is spot welded at each end to each stainless steel clamps 7a, 7b to avoid rotation of the clamps around the circumference of the coupling.

A particular advantage of the coupling device shown in FIG. 3 is that the glass side clamp 7b can be tightened independently for the Teflon side clamp 7a, such that the rigidity and fragility of the glass, and the plasticity and flexibility of the Teflon are both to be taken into account by tightening each side's clamp accordingly (glass less pressure, Teflon greater pressure).

Figure 4:
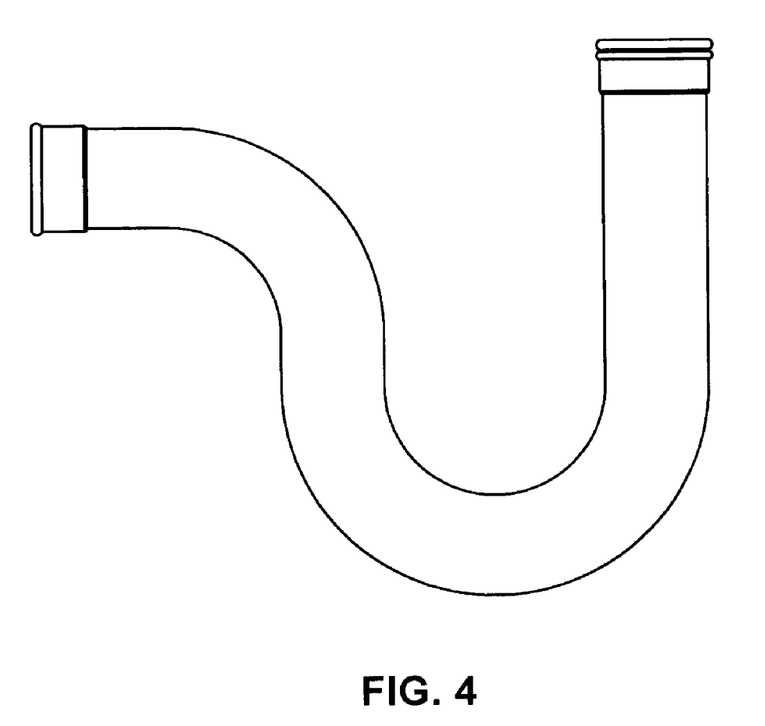
FIG. 4 shows the beaded P-trap embodiment of the invention in side view.

It is envisioned that the coupling device shown in FIG. 3 will be used to couple a Teflon P-trap such as is shown in FIG. 4 to a glass-ended laboratory sink, although pipe-to-pipe coupling will also be made with the coupling device.

Figure 8:
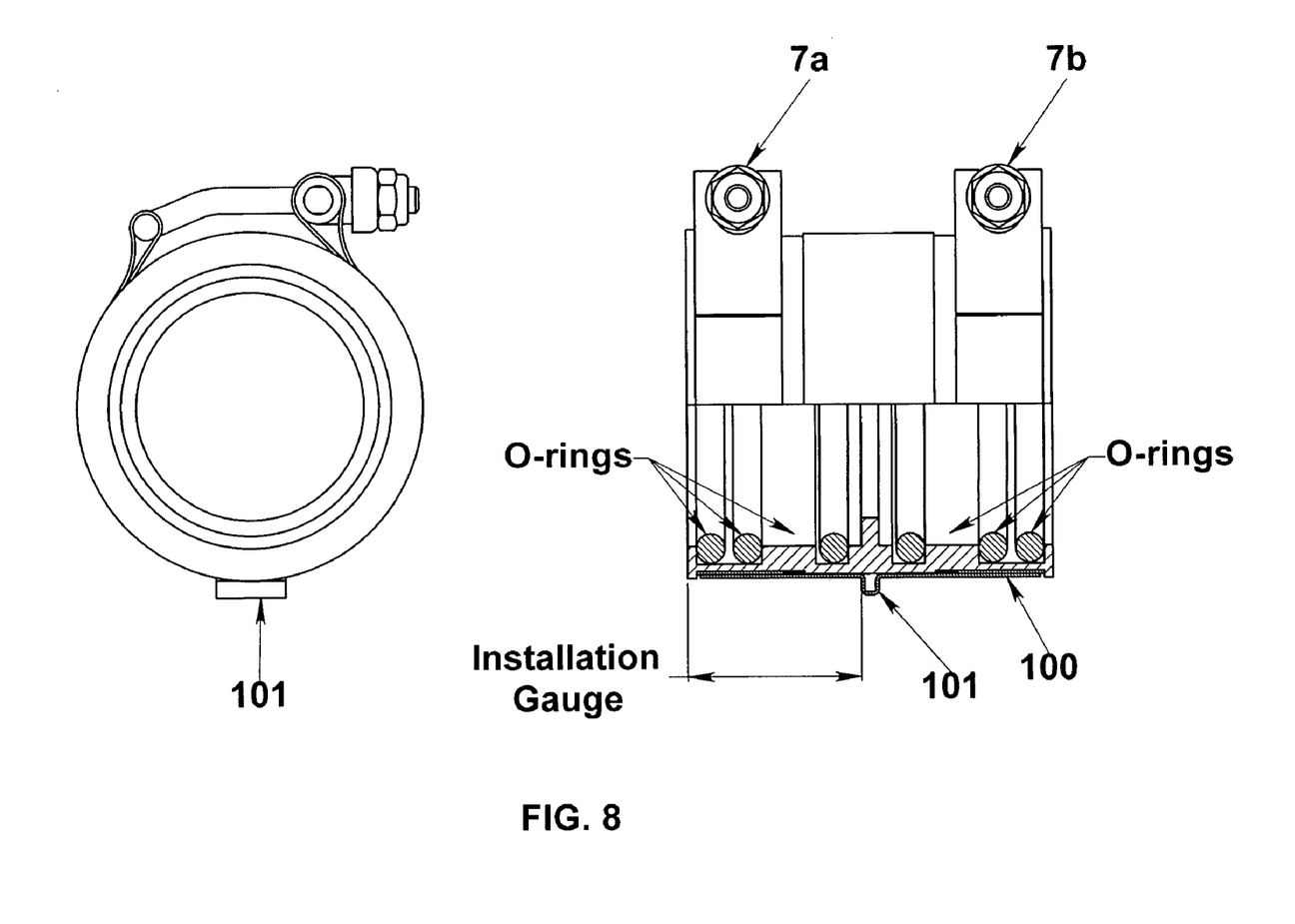
FIG. 8 shows another embodiment of the coupling device of the invention having an installation gauge.

FIG. 8 shows a coupling device employing the principles just described. The coupling includes an installation gauge or step 101, a feature that allows the installer to mark the pipe and thus gauge with certainty that the coupling is fully installed. The installation gauge can be present as a raised portion, e.g., a spot weld, which marks the center of the coupling. The gauge thus provides the measurer with a means to measure the distance from the center of the coupling to the end of the coupling, and to mark the correct length of the tubing on the tube to be inserted inside the coupling. This allows the installer to make a visible mark on the tube and to ascertain whether the tube has in fact been fully and properly inserted into the coupling to avoid improper installation.

Note that in the embodiment shown in FIG. 8, there are two O-rings positioned toward the outer ends of the coupling and a single O-ring positioned toward the center of the coupling, illustrating a variation of the O-ring positioning shown in FIG. 3.

The present invention also resides in the various charts, drawings, diagrams and notes contained in Appendix A hereto and incorporated herein by reference in its entirety.

What is claimed is:

1. A device for coupling two fluid carrying pipe sections, said device comprising:

a substantially cylindrical coupling body having inside and outside walls and proximal and distal end openings;

a retaining wall radially extending inward from the inside wall of said coupling body;

sets of one or more annular sealing members positioned between said retaining wall and each of said ends of said body; and at least one clamp to asymmetrically apply pressure axially along said body to plastically deform at least one pipe section to form annular grooves for securing said at least one pipe section to said device and to form seals around said at least one pipe section by said sets of sealing members; and wherein said sets of sealing members are operable to expand to compensate for the effects of creep, thereby maintaining the seals around said at least one pipe section; and wherein substantial surface portions of said body, wall, and sealing members consist essentially of non-reactive material so said device can be used in corrosive applications.

2. The device of claim 1, wherein said sealing members form primary and secondary seals around the pipe sections.

3. The device of claim 1, wherein said at least one clamp is securely fastened to said body to prevent rotation of said at least one clamp around the circumference of said body.

4. The device of claim 1, wherein the pipe sections are polytetrafluorethylene (PTFE) pipe sections.

5. The device of claim 1, wherein said pipe sections are made of different material; and wherein two clamps are operated independently of each other to couple the pipe sections.

6. The device of claim 5, wherein one of said pipe sections is a polytetrafluorethylene (PTFE) pipe section and the other pipe section is a glass pipe section.

7. The device of claim 1, wherein said sealing member is made of an elastomer material.

8. The device of claim 1, wherein said sealing member is encapsulated with PTFE.

9. The device of claim 1, wherein said sealing member is an o-ring.

10. The device of claim 7, wherein said sealing member is an o-ring.

11. The device of claim 8, wherein said sealing member is an o-ring.

* * * * *